(12) United States Patent
Byrne et al.

(10) Patent No.: US 7,623,182 B2
(45) Date of Patent: Nov. 24, 2009

(54) CAMERA INTERFACE MODULE

(75) Inventors: Daniel J. Byrne, Fort Collins, CO (US);
Jeff B. Beemer, Loveland, CO (US);
Amol Subhash Pandit, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 11/401,141

(22) Filed: Apr. 10, 2006

(65) Prior Publication Data

US 2007/0236576 A1 Oct. 11, 2007

(51) Int. Cl.
H04N 5/225 (2006.01)
H01R 13/64 (2006.01)
H01R 25/00 (2006.01)

(52) U.S. Cl. .................. 348/375; 348/373; 439/374; 439/638

(58) Field of Classification Search .................. 348/373, 348/375, 374; 439/374, 638, 639, 377, 928.1, 439/929; 361/600, 683, 679.41; 710/303; 320/113, 115
See application file for complete search history.

(56) References Cited

U.S. PATENT DOCUMENTS

| | | | | |
|---|---|---|---|---|
| 5,528,285 A * | 6/1996 | Morikawa et al. | ........ | 348/14.01 |
| 6,628,326 B1 * | 9/2003 | Manico et al. | ......... | 348/211.12 |
| 6,648,661 B1 * | 11/2003 | Byrne et al. | ................ | 439/188 |
| 6,693,665 B1 * | 2/2004 | Shindo et al. | ............ | 348/207.2 |
| 6,750,902 B1 * | 6/2004 | Steinberg et al. | ......... | 348/211.3 |
| 6,950,142 B2 * | 9/2005 | Soumi et al. | ................ | 348/375 |
| 7,167,206 B2 * | 1/2007 | Kayanuma | .................. | 348/375 |
| D544,899 S * | 6/2007 | Li et al. | ...................... | D16/242 |
| 7,295,244 B2 * | 11/2007 | Manico et al. | ............. | 348/373 |
| 7,381,095 B2 * | 6/2008 | Freeman et al. | ............. | 439/638 |
| 7,411,608 B1 * | 8/2008 | Moskaluk et al. | ......... | 348/207.2 |
| 2002/0072935 A1 * | 6/2002 | Rowse et al. | ................... | 705/4 |
| 2002/0149695 A1 | 10/2002 | Kayanuma | | |
| 2003/0117499 A1 * | 6/2003 | Bianchi et al. | ........... | 348/211.2 |
| 2003/0214602 A1 * | 11/2003 | Battles et al. | ............... | 348/375 |
| 2004/0041933 A1 * | 3/2004 | Fredlund et al. | ....... | 348/333.01 |
| 2004/0105024 A1 * | 6/2004 | Takahashi | .............. | 348/333.01 |
| 2004/0150944 A1 * | 8/2004 | Byrne et al. | ................ | 361/683 |
| 2004/0257464 A1 * | 12/2004 | Pandit et al. | ................ | 348/373 |
| 2005/0225666 A1 * | 10/2005 | Katakai | ...................... | 348/373 |
| 2006/0133773 A1 * | 6/2006 | Ohmura et al. | ............... | 386/68 |

FOREIGN PATENT DOCUMENTS

JP 2004246126 9/2004
JP 2006324820 11/2006

* cited by examiner

*Primary Examiner*—Tuan V Ho
*Assistant Examiner*—Marly Camargo

(57) ABSTRACT

A camera interface module is disclosed. The camera interface module has a first connector on one side configured to couple with a camera dock. The camera interface module has a second smaller connector on a second side configured to couple to a camera. The camera interface module has a standard input/output (I/O) connector and a power jack on a third side.

15 Claims, 3 Drawing Sheets

CAMERA INTERFACE MODULE

BACKGROUND OF THE INVENTION

1. Field of the Invention

The invention is related to the field of digital cameras, and in particular, to a camera interface module for the digital camera.

2. Statement of the Problem

Digital cameras are becoming smaller and more portable. Many digital cameras use a dock to upload the images onto a computer and/or charge the camera batteries. Typically the camera is coupled to the dock using a connector on the dock that mates with a matching connector on the bottom or side of the camera. The dock is typically designed for use with a number of different camera types or models. As some of the cameras become smaller, the connector used in the dock is too big to fit in the side or bottom of the cameras. Redesigning the dock to use a smaller connector prevents the dock from being used for older camera models and may cause inventory problems.

SUMMARY OF THE INVENTION

A camera interface module is disclosed. The camera interface module has a first connector on one side configured to couple with a camera dock. The camera interface module has a second smaller connector on a second side configured to couple to a smaller connector in a camera. The camera interface module has a standard input/output (I/O) connector and a power jack on a third side.

DETAILED DESCRIPTION OF THE PREFERRED EMBODIMENT

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Many digital cameras have a dock. There may be a number of different camera models that use the same dock. Docks typically provide a connection path to computers and power for charging the camera batteries. The dock may provide additional connection paths to printers or other devices. The dock may also provide a user interface for accessing features provided by the dock. The user interface may contain a display, a keyboard or keypad, special function buttons, or a combination of these types of user interface devices. In one example embodiment of the invention, the dock couples to the bottom or side of the camera using a camera specific input/output (I/O) connector. The camera specific I/O connector is typically mounted on the top of the dock. The mating connector on the camera is typically placed on the bottom of the camera. The camera specific I/O connector typically supplies input/output connections and power to the camera. Standard I/O connectors, for example USB connectors, are typically placed on the side or back of the dock for the connections between the dock and the other devices. A power jack is also typically placed on the side or back of the dock for connecting the dock to AC power, typically through a DC converter. A user typically connects their dock to their computer using a dedicated cable. The user also typically leaves the dock connected to the DC converter. This allows the user to be able to upload images or charge the camera batteries by simply plugging the camera into the dock. Unfortunately, having the dock integrated into the user's home or office system may limit the portability of the dock.

Some cameras have the camera specific I/O connector as the only connector on the camera and do not have a standard I/O connector or a power jack on the camera. These types of cameras must use the dock to connect to other devices or charge the batteries in the camera. One of the reasons that the cameras may only have one connector is that the size of the cameras has been reduced and there is not enough space on the camera for multiple connectors. Because of the small size of the camera, the connector may also be small. The small connector may no longer be compatible with the connector in a typical camera dock.

Figure 1:
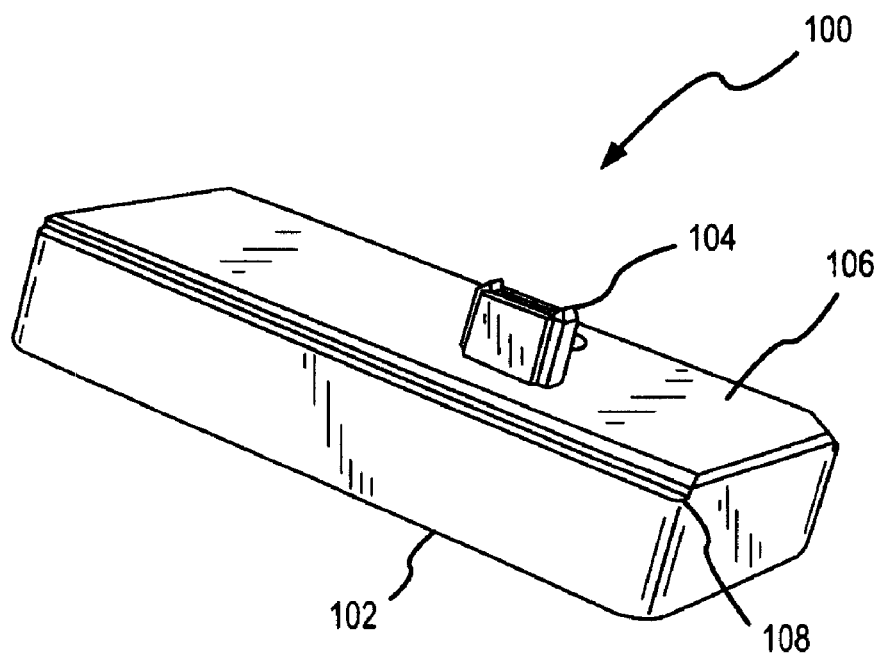
FIG. 1 is an isometric view of a camera interface module (CIM) in one example embodiment of the invention.

FIG. 1 is an isometric view of a camera interface module (CIM) in one example embodiment of the invention. Camera interface module 100 comprises CIM body 102, camera specific I/O connector 104, and mounting feature 108. The top face of CIM body is generally rectangular in shape, but may take other shapes, for example oval, square, circular, or the like, all within the scope of the invention. Camera specific I/O connector 104 is mounted on the top face of CIM 100. A camera would attach to CIM 100 by plugging the mating connector on the bottom of the camera into camera specific I/O connector 104. In another embodiment of the invention, camera specific I/O connector 104 may be mounted on the side of CIM 100 allowing the mating connector on the camera to be mounted on the side or back on the camera.

Figure 2:
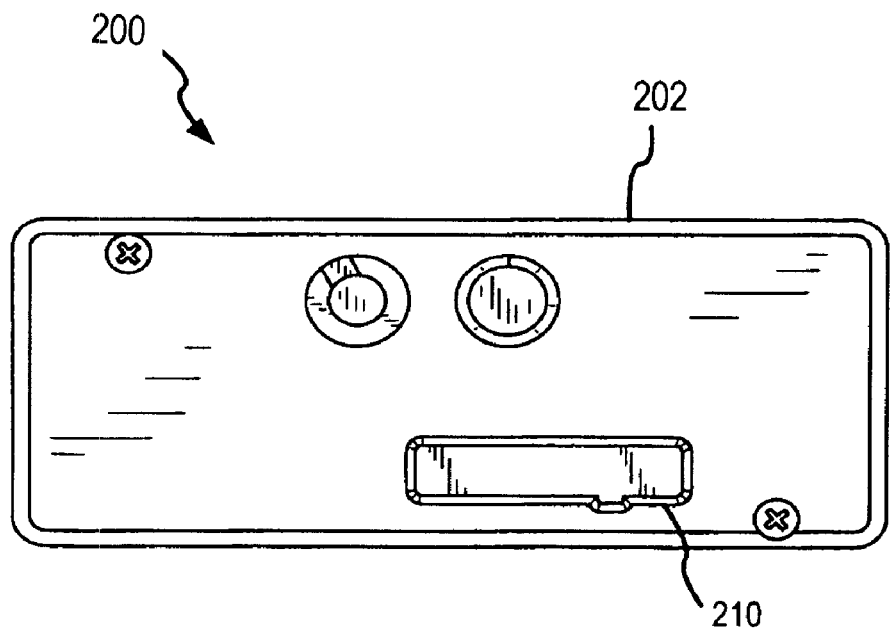
FIG. 2 is a bottom view of CIM 200 in an example embodiment of the invention.

FIG. 2 is a bottom view of CIM 200 in an example embodiment of the invention. CIM 200 comprises a CIM body 202 and dock specific I/O connector 210. Dock specific I/O connector 210 is typically larger than camera specific I/O connector 104. CIM 200 would be coupled to a dock by plugging dock specific I/O connector 210 onto a mating connector on the dock (see FIG. 4).

Figure 3:
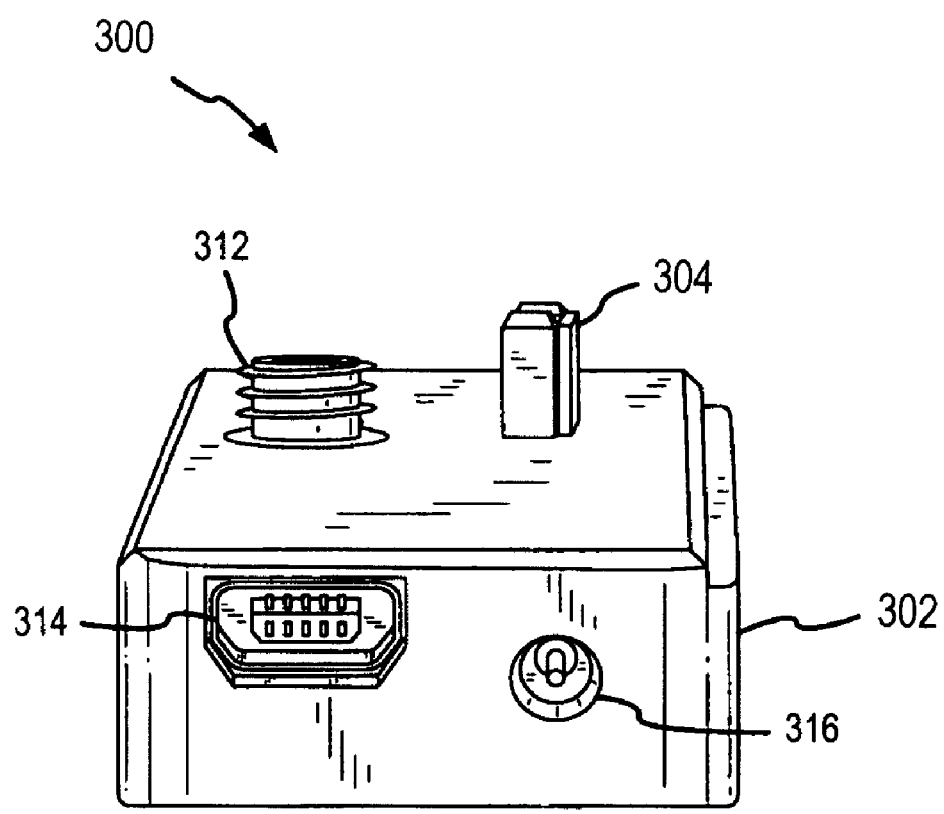
FIG. 3 is an isometric side view of CIM 200 in an example embodiment of the invention.

FIG. 3 is an isometric side view of CIM 300 in an example embodiment of the invention. CIM 300 comprises a CIM body 302, camera specific I/O connector 304, optional attachment unit 312, standard I/O connector 314, and power jack 316. Camera specific I/O connector 304 is mounted in the top face of CIM body 302. Standard I/O connector 314 and power jack 316 are mounted on a side face of CIM body 302. Standard I/O connector 314 is shown as a USB connector in this example embodiment of the invention, but may be any type of standard I/O connector. Optional attachment unit 312 may be used to rigidly attach CIM 300 onto the bottom of a camera. In one example embodiment of the invention, optional attachment unit 312 may use a standard tripod thread. A separate DC adapter (not shown) may be included with CIM 300. When CIM 300 is not attached to a dock, CIM 300 can be used to connect the camera with a computer or other device. The user would mount the camera onto CIM 300 and then connect a standard cable between the device and the standard I/O connector 304 on CIM 300. A user may also charge the batteries in the camera using CIM 300. The user would mount the camera onto CIM 300 and plug a power transformer into power jack 316 on CIM 300.

Figure 4:
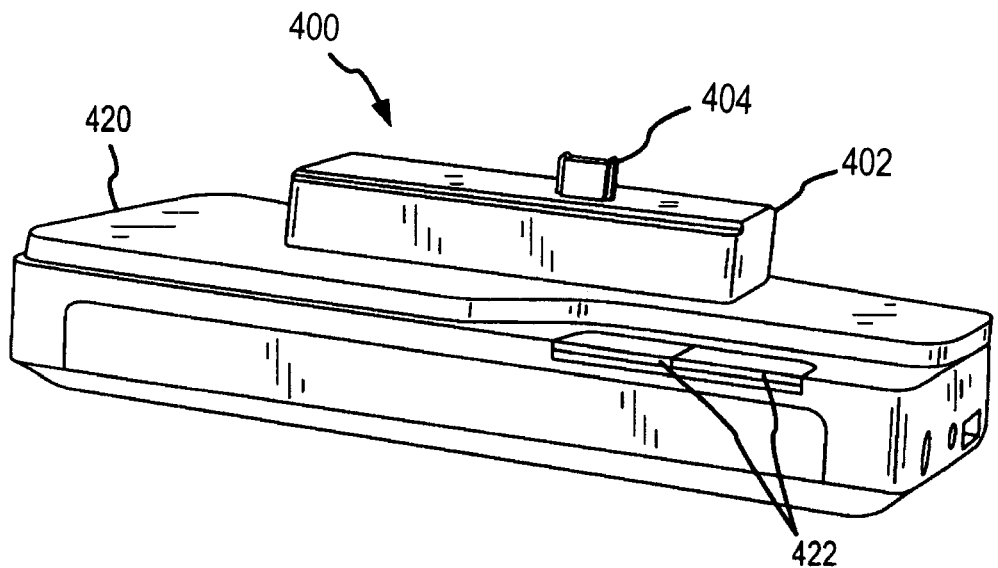
FIG. 4 is an isometric view of CIM 400 mounted on dock 420 in an example embodiment of the invention.

FIG. 4 is an isometric view of CIM 400 mounted on dock 420 in an example embodiment of the invention. Dock 420 has two user interface (UI) buttons 422 on the front side of dock 420. Dock 420 also typically contains standard I/O connectors and a power jack (not shown). CIM 400 is attached to the camera specific I/O connector (not shown) extending from the top surface of dock 420 with the mating dock specific I/O connector mounted on the bottom of CIM 400. A smaller camera specific I/O connector 404 extends from the top surface of CIM body 402. In use, a camera would attach to CIM 400 by plugging a mating camera specific I/O connector mounted on the camera bottom onto camera specific I/O connector 404. CIM 400 acts as an adapter and allows a camera with a small camera specific I/O connector, to use a dock with a larger camera specific I/O connector.

Figure 5:
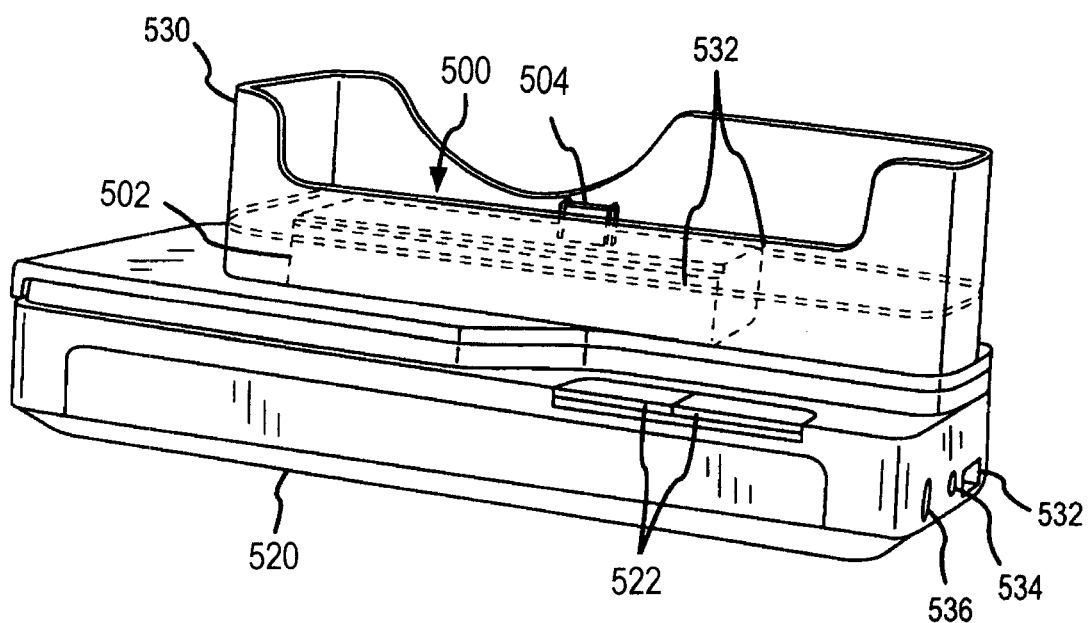
FIG. 5 is an isometric view of CIM 500 and insert 530 attached to dock 520 in an example embodiment of the invention.

FIG. 5 is an isometric view of CIM 500 and insert 530 attached to dock 520 in an example embodiment of the invention. Dock 520 comprises two user interface buttons 522, first standard I/O connector 532, second standard I/O connector 536 and power jack 534. CIM 500 is attached to the camera specific I/O connector (not shown) extending from the top surface of dock 520 with the mating dock specific I/O connector mounted on the bottom of CIM 500. A smaller camera specific I/O connector 504 extends from the top surface of CIM body 502. Insert 530 is attached to CIM body 502 and is configured to help guide a camera onto camera specific I/O connector 504. In one example embodiment of the invention, insert 530 snaps onto a mounting feature 108 (shown in FIG. 1) formed into the edges of CIM body 502 using an interference fit. Other methods may be used to attach insert 530 onto CIM 500. In another example embodiment of the invention, insert 530 may be attached to dock 520.

Insert 530 may also be configured to cover the power jack and standard I/O connectors on the side of CIM body 502 making the power jack and standard I/O connectors on the side of CIM body inaccessible when inset 530 is mounted onto the CIM body 502. This would prevent a user from connecting power and/or an interface cable to both the dock 520 and the CIM 500 at the same time. In one example embodiment of the invention, the power jack and standard I/O connector in the CIM would automatically be electrically disconnected when the CIM was mounted onto a dock. In another example embodiment of the invention, the electronics inside the dock and CIM 500 would automatically adjust to whichever power jack was connected to the DC transformer.

In use, the camera interface module allows a user to mount a camera with a small interface connector onto a dock configured for cameras with larger interface connectors. In addition, the CIM may be unplugged from the dock and provides a user with portable charging functionality and basic connectivity when the user is away from the dock. By providing the user with portable charging functionality and basic connectivity, the user does not need to remove the dock from their integrated home or office computer system.

We claim:

1. A camera interface module (CIM), comprising:
    a first connector mounted on a first side, the first connector having a first size where the first connector is configured to couple to a camera dock;
    a second connector mounted on a second side, the second connector having a second size, where the second size is smaller than the first size, and where the second connector is configured to couple to a camera;
    a standard I/O connector and a power jack mounted on a third side, wherein the CIM is configured to electrically couple the camera to a computer and a power source only through the first connector when the CIM is coupled to the camera dock and through the standard I/O connector and the power jack respectively when the CIM is disconnected from the camera dock;
    wherein the CIM is configured such that the standard I/O connector and the power jack are inaccessible when the camera interface module is mounted in the camera dock.

2. The camera interface module of claim 1 further comprising:
    An insert attached to the camera interface module where the insert covers the standard I/O connector and the power jack on the third side and where the insert is configured to guide a camera onto the second connector.

3. The camera interface module of claim 2 where the insert is configured to attach onto the camera interface module using an interference fit.

4. The camera interface module of claim 1 where the standard I/O connector and the power jack are automatically electrically disabled when the camera interface module is mounted in the camera dock.

5. The camera interface module of claim 1 where the standard I/O connector is a USB connector.

6. The camera interface module of claim 1 where first side is a bottom side and the second side is a top side.

7. The camera interface module of claim 1 where the first connector is automatically electrically disabled when the CIM is disconnected from the camera dock and power is applied to the power jack.

8. A camera docking system, comprising:
    a dock having a first size camera specific I/O connector mounted on a top side of the dock;
    a camera interface module (CIM) comprising
        a first camera specific I/O connector mounted on a bottom side of the CIM and configured to couple to the first size camera specific I/O connector mounted on the top side of the dock;
        a second camera specific I/O connector mounted on a top side of the CIM, where the size of the second camera specific I/O connector is smaller than the size of the first camera specific I/O connector; and
        a standard I/O connector and a power jack mounted on a third side of the CIM; and
    a camera with a second size camera specific I/O connector configured to couple to the second size camera specific I/O connector mounted on the top side of the CIM, wherein the CIM is configured to electrically couple the camera to a computer and a power source only through the first camera specific I/O connector of the CIM when the CIM is coupled to the dock, and through the standard I/O connector and the power jack respectively when the CIM is disconnected from the dock.

9. A method for manufacturing a camera interface module, comprising:
    mounting a first connector on a first side, the first connector having a first size where the first connector is configured to couple to a camera dock;
    mounting a second connector on a second side, the second connector having a second size, where the second size is smaller than the first size, and where the second connector is configured to couple to a camera;

mounting a standard I/O connector and a power jack on a third side; and providing a mechanism that electrically couples the camera to a computer and a power source only through the first connector when the camera interface module is coupled to the camera dock, and through the standard I/O connector and the power jack respectively when the CIM is disconnected from the camera dock;

wherein the module is configured such that the standard I/O connector and the power jack are inaccessible when the camera interface module is mounted in the camera dock.

10. The method for manufacturing a camera interface module of claim 9 further comprising:

forming an insert configured to attached to the camera interface module where the insert covers the standard I/O connector and the power jack on the third side and where the insert is configured to guide a camera onto the second connector.

11. The method for manufacturing a camera interface module of claim 10 where the insert is configured to attach onto the camera interface module using an interference fit.

12. The method for manufacturing a camera interface module of claim 9 where the standard I/O connector and the power jack are automatically electrically disabled when the camera interface module is mounted in the camera dock.

13. The method for manufacturing a camera interface module of claim 9 where the standard I/O connector is a USB connector.

14. The method for manufacturing a camera interface module of claim 9 where first side is a bottom side and the second side is a top side.

15. A camera interface module (CIM), comprising:

a first connector mounted on a first side, the first connector having a first size where the first connector is configured to couple to a camera dock;

a second connector mounted on a second side, the second connector having a second size, where the second connector is configured to couple to a camera;

a standard I/O connector; and a power jack, wherein the CIM is configured to electrically couple the camera to a computer and a power source only through the camera dock when the CIM is coupled to the camera dock, and through the standard I/O connector and the power jack respectively when the CIM is disconnected from the camera dock;

wherein the CIM is configured such that the standard I/O connector and the power jack are inaccessible when the camera interface module is mounted in the camera dock.

* * * * *

UNITED STATES PATENT AND TRADEMARK OFFICE
CERTIFICATE OF CORRECTION

PATENT NO. : 7,623,182 B2 Page 1 of 1
APPLICATION NO. : 11/401141
DATED : November 24, 2009
INVENTOR(S) : Daniel J. Byrne et al.

It is certified that error appears in the above-identified patent and that said Letters Patent is hereby corrected as shown below:

In column 4, line 9, in Claim 1, delete "dock" and insert -- dock, --, therefor.

In column 4, line 17, in Claim 2, delete "An" and insert -- an --, therefor.

In column 5, line 15, in Claim 10, after "configured to" insert -- be --.

Signed and Sealed this

Twenty-ninth Day of June, 2010

David J. Kappos
*Director of the United States Patent and Trademark Office*